United States Patent
Ogaya et al.

(10) Patent No.: US 10,747,025 B2
(45) Date of Patent: Aug. 18, 2020

(54) POLARIZING LENS, EYEWEAR, AND METHOD FOR MANUFACTURING POLARIZING LENS

(71) Applicant: HOYA LENS THAILAND LTD., Patumthani (TH)

(72) Inventors: Daisuke Ogaya, Tokyo (JP); Masaki Ihara, Tokyo (JP); Akinori Yamamoto, Tokyo (JP); Toshihiko Shimizu, Tokyo (JP); Kenichi Tonouchi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 265 days.

(21) Appl. No.: 15/028,646

(22) PCT Filed: Oct. 17, 2014

(86) PCT No.: PCT/JP2014/077752
§ 371 (c)(1),
(2) Date: Apr. 11, 2016

(87) PCT Pub. No.: WO2015/056801
PCT Pub. Date: Apr. 23, 2015

(65) Prior Publication Data
US 2016/0349538 A1      Dec. 1, 2016

(30) Foreign Application Priority Data
Oct. 17, 2013    (JP) .................................. 2013-216303

(51) Int. Cl.
*G02C 7/12*      (2006.01)
*B29C 65/56*     (2006.01)
(Continued)

(52) U.S. Cl.
CPC ................ *G02C 7/12* (2013.01); *B29C 65/56* (2013.01); *B29D 11/00432* (2013.01);
(Continued)

(58) Field of Classification Search
CPC ........ G02B 7/12; G02B 2202/16; G02B 1/08; G02B 1/18; G02B 27/26; G02B 5/3033;
(Continued)

(56) References Cited

U.S. PATENT DOCUMENTS 3,959,242 A  *  5/1976  Watts ....................... B05D 5/08
                                                              525/56
6,145,984 A     11/2000  Farwig
(Continued)

FOREIGN PATENT DOCUMENTS

JP     2004-258165 A     9/2004
JP     2007-523768 A     8/2007
(Continued)

OTHER PUBLICATIONS

Jan. 6, 2015 Search Report issued in International Patent Application No. PCT/JP2014/077752.
(Continued)

*Primary Examiner* — Nancy R Johnson
(74) *Attorney, Agent, or Firm* — Oliff PLC

(57) ABSTRACT

A polarizing lens including a polarizing polyvinyl alcohol film arranged between two pieces of a lens base material, where the polarizing polyvinyl alcohol film includes a hydrophobic region having higher hydrophobicity than other regions at least at a partial region of an outer periphery part including an edge surface thereof and the hydrophobic region is exposed at least at a part of an edge surface of the lens.

4 Claims, 10 Drawing Sheets

(51) Int. Cl.
*B29D 11/00* (2006.01)
*G02B 1/08* (2006.01)
*G02B 1/18* (2015.01)
*G02B 5/30* (2006.01)
*G02B 30/25* (2020.01)
*B29K 29/00* (2006.01)
*B29K 709/08* (2006.01)
*B29L 11/00* (2006.01)

(52) U.S. Cl.
CPC .......... *B29D 11/00644* (2013.01); *G02B 1/08* (2013.01); *G02B 1/18* (2015.01); *G02B 5/3033* (2013.01); *G02B 30/25* (2020.01); *B29K 2029/04* (2013.01); *B29K 2709/08* (2013.01); *B29K 2995/0026* (2013.01); *B29K 2995/0034* (2013.01); *B29L 2011/0016* (2013.01); *G02C 2202/16* (2013.01)

(58) Field of Classification Search
CPC ........ B29D 11/00432; B29D 11/00644; B29C 65/56; B29K 2029/04; B29K 2995/0034; B29K 2709/08; B29K 2995/0026; B29L 2011/0016

See application file for complete search history.

(56) References Cited

U.S. PATENT DOCUMENTS

| | | | |
|---|---|---|---|
| 6,676,257 | B2 | 1/2004 | Sheldon et al. |
| 7,767,304 | B2 | 8/2010 | Berzon |
| 2002/0191148 | A1 | 12/2002 | Sheldon et al. |
| 2004/0212884 | A1 | 10/2004 | Satake et al. |
| 2006/0092374 | A1* | 5/2006 | Ishak ................. G02C 7/12 351/159.57 |
| 2007/0098999 | A1 | 5/2007 | Berzon |
| 2008/0036964 | A1 | 2/2008 | Miura et al. |
| 2009/0091825 | A1 | 4/2009 | Saito et al. |
| 2011/0215493 | A1 | 9/2011 | Miura et al. |
| 2013/0208239 | A1 | 8/2013 | Jiang et al. |
| 2013/0302599 | A1* | 11/2013 | Oya ..................... C09D 5/1618 428/336 |
| 2014/0034222 | A1* | 2/2014 | Jiang ................. B29D 11/0073 156/182 |
| 2017/0102558 | A1* | 4/2017 | Saylor ................... G02C 7/104 |

FOREIGN PATENT DOCUMENTS

| | | |
|---|---|---|
| JP | 2007-316595 A | 12/2007 |
| JP | 2010-085911 A | 4/2010 |
| JP | 2010-091815 A | 4/2010 |
| JP | 2013-057910 A | 3/2013 |
| WO | 2005/075533 A1 | 8/2005 |
| WO | 2008/018168 A1 | 2/2008 |

OTHER PUBLICATIONS

Apr. 19, 2016 International Preliminary Report on Patentability issued in International Patent Application No. PCT/JP2014/077752.
Feb. 7, 2017 Office Action issued in Japanese Patent Application No. 2015-542913.
Aug. 31, 2016 Office Action issued in Australian Patent Application No. 2014335244.
May 9, 2017 Extended Supplementary Search Report issued in European Patent Application No. 14854834.0.
Prosanov et al., "Complex of polyvinyl alcohol with boric acid: Structure and use", Materials Today Communications, 2018, pp. 77-81, vol. 14.
Dec. 13, 2018 Office Action issued in European Application No. 14 854 834.0.

* cited by examiner (A)

(B)

(C)

POLARIZING LENS, EYEWEAR, AND METHOD FOR MANUFACTURING POLARIZING LENS

CROSS-REFERENCE TO RELATED APPLICATIONS

The present application claims priority of Japanese Patent Application No. 2013-216303, filed Oct. 17, 2013, the entire description thereof is hereby specifically incorporated as a disclosure.

TECHNICAL FIELD

The present invention relates to a polarizing lens, eyewear including this polarizing lens, and a method for manufacturing a polarizing lens.

BACKGROUND ART

A polarizing lens has a light-shielding function and thus is often used as a lens for sunglasses (including fashion glasses) without prescriptions for protection of eyes. The use of a polarizing lens is not limited thereto but also includes a spectacle lens with a prescription.

Polarizing lenses described in Patent Literature 1 and Patent Literature 2 include a polarizing film buried therein and is manufactured by injecting a curable composition around the polarizing film and heating to allow for curing thereof.

Meanwhile, in FIG. 5 and more of Patent Literature 3 also disclose a swimming goggle including a polarizing lens including a polarizing film buried therein, more specifically, a polarizing lens where a polarized filter film is interposed between two layers of plastic or the like.

Meanwhile, frames of eyewear have various designs such as a full-rim type, rimless type with no rim at an edge surface of a lens (including a rimlon type), and a goggle type. Generally, a polarizing lens is formed into a round shape, subjected to edging processing to process into a lens shape of a frame, and attached to the frame; however, the lens may be formed to fit the lens shape of the frame in advance. In either case, in a polarizing lens including a polarizing film buried therein, an edge surface of the polarizing film is usually exposed at an edge surface of the lens.

Patent Literature 1: JP 2007-316595 A
Patent Literature 2: JP 2007-523768 W
Patent Literature 3: U.S. Pat. No. 6,676,257

The entire descriptions of Patent Literature 1 and English patent family member US2009/091825A1, Patent Literature 2 and English patent family member US2007/098999A, U.S. Pat. No. 7,767,304, and Patent Literature 3 are hereby specifically incorporated as disclosures.

SUMMARY OF INVENTION

As a definition of terms, in the present invention and hereinafter, a term polarizing lens means a lens of a meniscus shape where a polarizing film is arranged (interposed) between two pieces of a lens base material without discriminating optical designs or lens power.

A term eyewear includes eyewear for eyesight correction where at least one of lenses on the left and right attached to a frame is a lens (spectacle lens) having an eyesight corrective function that optically satisfies a prescription, namely spectacles, as well as various eyewear other than spectacles such as sunglasses (including fashion glasses) and goggles. Further, sunglasses or goggles where at least one of lenses on the left and right is a lens (spectacle lens) having an eyesight corrective function that optically satisfies a prescription are also included in the term eyewear.

A term spectacle lens means a finished lens (both surfaces are final prescription surfaces) or semifinished lens (only one surface is a final prescription surface) having a meniscus shape, where a lens shape is in an uncut or cut state.

As for a frame, a type of frame where a rim (lens frame) is formed around the entire periphery of a lens is defined as a full-rim frame and a type of frame where a part or all of an edge surface of a lens is exposed is defined as a rimless frame. All frames, as well as goggles, are included in either of these definitions. Therefore, a rimlon type having a rim bar, where a groove is formed in an edge surface of a lens and the rim bar is fitted to the groove part with nylon, synthetic resin, fine wire, or the like to retain the edge surface of the lens, is included in the rimless frame. Furthermore, a frame of a sports type or goggle type is also classified by the above definitions depending on the aforementioned exposure state of an edge surface of a lens.

When a polarizing film is exposed at an edge surface of a polarizing lens as described above, water or alkaline cleaning liquid may permeate from the edge surface upon dying for processing, hard coat, polishing treatment, washing or the like, which may result in melting and deterioration of an outer periphery part of the polarizing film. A similar phenomenon may occur also with a polarizing lens included in eyewear used for water sports such as swimming goggles.

Moreover, even after a polarizing lens is attached to a frame, if the frame is a rimless frame, a polarizing film is exposed at a part without a rim as described above and thus a similar phenomenon may occur. Therefore, usually, a full-rim type is selected as a frame design for spectacles or sunglasses including a polarizing lens. That is, a frame design for a polarizing lens has an implicit constraint.

Meanwhile, even with a frame of a full-rim type, for example when spectacles are dropped into water, water may permeate from a slight gap between the frame and edge surface of a polarizing lens, which may result in melting and deterioration part of an outer periphery of a polarizing film. With regard to this point, Patent Literature 3 discloses that a sealing member of a ring shape is fitted to an outer periphery part of a polarizing lens. However, when adhesion between an edge surface of the polarizing lens and sealing member is not sufficient, water may permeate from a slight gap between the edge surface of the polarizing lens and sealing member, which may result in melting and deterioration of an outer periphery part of the polarizing film.

Therefore, an object of the present invention is to provide a polarizing lens where deterioration of a polarizing film is suppressed.

As the polarizing film, usually, polyvinyl alcohol (hereinafter also referred to as "PVA") is impregnated in iodine or dichroic dye, which is then formed into a film shape and extended along one axis direction to use a film obtained therefrom. This is because PVA is preferable as a film material since it is superior in any of transparency, heat resistance, affinity with iodine or dichroic dye, and orientation upon extension. In the present invention and hereinafter, a polyvinyl alcohol film containing a dye component selected from a group consisting of iodine and dichroic dye and showing a polarizing property is referred to as "polarizing polyvinyl alcohol film".

The present inventors focused on a point that PVA that forms a film is a resin having a hydroxyl group and high hydrophilicity during repeated examinations for achieving the aforementioned object. As a result of further repeated keen examinations, a new finding has been obtained that hydrophobization of a region of a polarizing polyvinyl alcohol film exposed at an edge surface of a lens can prevent water or the like from permeating into the outer periphery part of the polarizing polyvinyl alcohol film, which can prevent deterioration of the polarizing polyvinyl alcohol film.

The present invention has been completed based on the above finding.

One aspect of the present invention relates to a polarizing lens including a polarizing polyvinyl alcohol film arranged between two pieces of a lens base material, where the polarizing polyvinyl alcohol film includes a hydrophobic region having higher hydrophobicity than other regions at least at a partial region of an outer periphery part including an edge surface thereof and the hydrophobic region is exposed at least at a part of an edge surface of the lens.

In one aspect, the hydrophobic region is formed by reaction between a hydroxyl group included in polyvinyl alcohol included in the region and a functional group having reactivity with the hydroxyl group at least at the partial region.

In one aspect, the reaction is selected from a group consisting of cross-linking reaction, dehydration reaction, and halogenation.

In one aspect, the reaction is cross-linking reaction between polyvinyl alcohol and a cross-linking agent. In a further aspect, the cross-linking agent is aldehyde and the cross-linking reaction is acetalization.

Still further aspect of the present invention relates to eyewear including a frame and the lens attached to the frame.

In one aspect, the eyewear is spectacles.

Yet further aspect of the present invention relates to a method for manufacturing a polarizing lens including the steps of producing a polarizing lens where a polarizing polyvinyl alcohol film is arranged between two pieces of a lens base material and the polarizing polyvinyl alcohol film is exposed at least at a part of an edge surface of the lens and applying hydrophobization treatment to the polarizing polyvinyl alcohol film exposed at the edge surface of the lens.

In one aspect, the hydrophobization treatment is performed by allowing the polarizing polyvinyl alcohol film exposed at the edge surface of the lens to be in contact with a hydrophobizing agent including the functional group having reactivity with the hydroxyl group.

In one aspect, the hydrophobizing agent includes polyvinyl alcohol and a compound that may cause reaction selected from a group consisting of cross-linking reaction, dehydration reaction, and halogenation.

In one aspect, the hydrophobizing agent is a cross-linking agent that may react with polyvinyl alcohol in a cross-linking manner. In a further aspect, the cross-linking agent is aldehyde and the cross-linking reaction is acetalization.

In one aspect, the aforementioned method for manufacturing a polarizing lens includes a step of forming the polarizing lens by a cast polymerization method (casting method), which will be described later. In a still further aspect, a polarizing polyvinyl alcohol film arranged in a forming mold in this step is applied with curved surface processing to deform into a curved surface.

In one aspect, the polarizing polyvinyl alcohol film having been subjected to the curved surface processing is subjected to heating treatment to heat at a heating temperature of 105° C. to less than 150° C. and then arranged in a forming mold. Apply the heating treatment at the above range of heating temperature after the curved surface processing is preferable from the following points.

In a polarizing lens produced by a cast polymerization method, deformation of the lens may cause astigmatism. This is due to deformation of a surface shape of the lens under influence of deformation of the polarizing film buried in the lens by heating during a step of manufacturing. A wearer of spectacles observing an object through spectacle lenses with astigmatism feels uncomfortableness of wearing (e.g. blurred images) caused by astigmatism. Therefore, in order to provide a spectacle lens having preferable wearing feeling, astigmatism should be prevented or mitigated.

Meanwhile, in the method for manufacturing a polarizing lens according to the above aspect, the polarizing film having been subjected to the curved surface processing is heated at the heating temperature of 105° C. to less than 150° C. before arrangement in the forming mold. Heating in this manner allows the polarizing film having been subjected to the curved surface processing to be deformed (shrink) before arrangement in the forming mold. This results in no shrinkage to deform the surface shape of the lens or a small level of shrinkage. This allows for providing a polarizing lens with slight aberration.

In one aspect, the manufacturing method includes wetting the polarizing film before the curved surface processing.

In one aspect, the manufacturing method includes wetting, during heating, the polarizing film before the curved surface processing, cooling the film, and subsequently performing the curved surface processing.

In one aspect, the cooling is performed by leaving the wetted polarizing film at the room temperature.

The present invention can provide a polarizing lens including a polarizing film of a high quality where deterioration of an outer periphery part thereof is mitigated or prevented.

DESCRIPTION OF EMBODIMENTS

Figure 1:
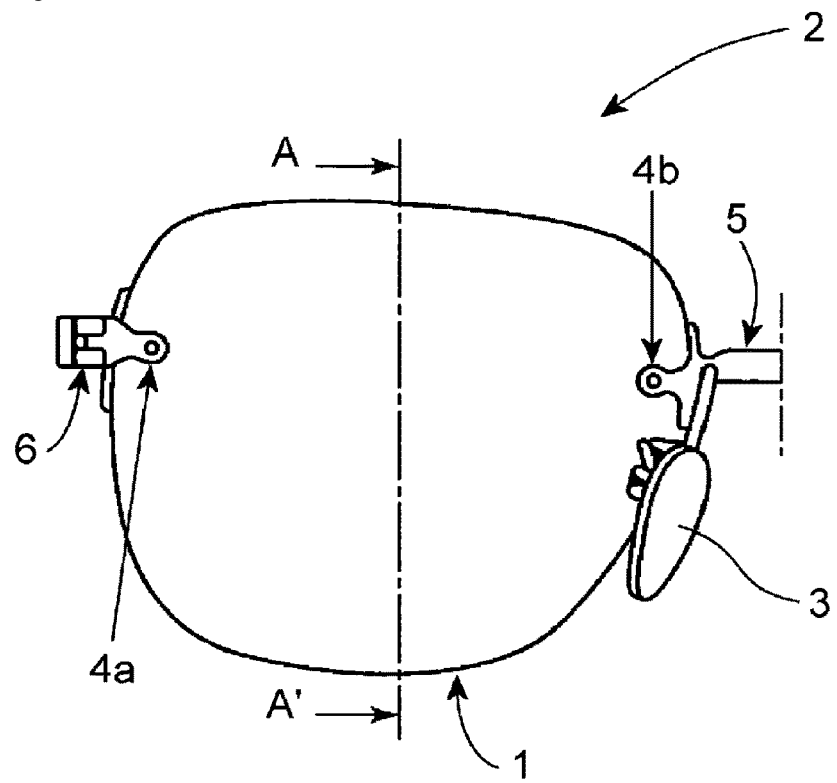
FIG. 1 is a front view of a left frame of rimless polarizing spectacles 2 of a two-point type using a polarizing lens 1 according to one aspect of the present invention.

One aspect of the present invention relates to a polarizing lens including a polarizing polyvinyl alcohol film arranged between two pieces of a lens base material, where the polarizing polyvinyl alcohol film includes a hydrophobic region having higher hydrophobicity than other regions at least at a partial region of an outer periphery part including an edge surface thereof and the hydrophobic region is exposed at least at a part of an edge surface of the lens. Hereinafter, the aforementioned polarizing lens will be further described in detail.

(Lens Base Material)

A lens base material is not specifically limited and may be a plastic lens base material such as acrylic resin, thiourethane-based resin, thioepoxy-based resin, methacrylate-based resin, allyl-based resin, episulfide-based resin, and polycarbonate resin. A molding method of the lens may be a cast polymerization method or injection molding method. The cast polymerization method is preferable. In either molding method, molding is performed such that the polarizing polyvinyl alcohol film (or a laminated film including this film as will be described later) is interposed between the lens base materials. For example upon molding a lens by the cast polymerization method, the polarizing polyvinyl alcohol film is arranged in a forming mold and thereafter polymerization reaction of lens raw material liquid is carried out. A preferable aspect of the polarizing film arranged in the forming mold here may be a polarizing film applied with the curved surface processing as described below and, more preferably, a polarizing film applied with the heating treatment at the aforementioned range of heating temperature after the curved surface processing.

(Polarizing Film)

The polarizing lens includes a polarizing polyvinyl alcohol film arranged between two pieces of the lens base material. The polarizing lens where the polarizing film is buried and interposed between two pieces of the lens base material can be preferably obtained by the cast polymerization method which is performed while the polarizing film is arranged in a forming mold. Details will be described later.

The polarizing film included in the polarizing lens is a polarizing polyvinyl alcohol film, which is usually produced by, as described earlier, extending a polyvinyl alcohol film containing iodine or dichroic dye. Incidentally, the polarizing polyvinyl alcohol film may be solely used as the polarizing film or may be used in the form of a laminated film where multiple layers including other layers are laminated. One example of a film that can form the multilayer film is a triacetylcellulose (TAC) film. The TAC film may function as a protective layer. For example, a laminated film of two or three layers where the TAC film is provided on one surface or both surfaces of the polarizing polyvinyl alcohol film may be used as the polarizing film. Hereinafter, the polarizing polyvinyl alcohol film or the laminated film including this film is also referred to as "polarizing film".

The above films may be commercial products or produced by a known method.

The thickness of a polarizing film is not specifically limited. Preferably, the thickness is set such that the curved surface processing of the film can easily be performed. The curved surface processing will be described later. For example, the thickness of the single-layer or multilayer polarizing film is preferably approximately 10 μm to 500 μm. This is because a thickness of 10 μm or more provides high rigidity and ease of handling while a thickness of 500 μm or less provides ease upon the curved surface processing of the film.

In the above polarizing lens, the polarizing polyvinyl alcohol film is, solely or in the form of the laminated film as described above, interposed between two pieces of a lens base material. Furthermore, an edge surface or at least a part of an outer periphery part including the edge surface of the polarizing polyvinyl alcohol film is exposed at least at a part of an edge surface of the lens. Usually, a polarizing lens where a part of the polarizing polyvinyl alcohol film is exposed in this manner is prone to deterioration by water or alkaline cleaning liquid. Meanwhile, the aforementioned polarizing lens allows for suppressing deterioration since at least a part of the exposed region, preferably all of the exposed region, is hydrophobized.

As the hydrophobization treatment, any treatment that is capable of hydrophobizing polyvinyl alcohol can be used without limitation. One specific aspect is treatment to cause reaction between a hydroxyl group that allows polyvinyl alcohol to be hydrophilic and a functional group having reactivity with the hydroxyl group (hereinafter referred to as "treatment 1"). This allows the treated region to be hydrophobized with a content ratio of hydroxyl group lower than that in untreated regions. Another specific aspect is treatment to apply a water repellent agent to the edge surface of the lens including the part where polarized polyvinyl alcohol is exposed (hereinafter referred to as "treatment 2").

The treatment 1 and treatment 2 are performed on a region including the edge surface of the lens and thus also referred to as "edge surface treatment" hereinafter. Hereinafter, each of the treatment will be further described in detail.

Hydrophobization Treatment by Treatment 1

The treatment 1 is to cause reaction between a hydroxyl group in the polyvinyl alcohol film that forms the polyvinyl alcohol film and a functional group having reactivity with the hydroxyl group. Contact between a compound including a functional group having reactivity with the hydroxyl group (hereinafter referred to as "hydrophobizing agent") and the polarizing polyvinyl alcohol film exposed at the edge surface of the lens allows for reaction between polyvinyl alcohol and the functional group of the hydrophobizing agent. The polyvinyl alcohol film exposed at the edge surface of the lens can be caused to be in contact with the hydrophobizing agent by, for example, a method to mix the hydrophobizing agent with a solvent and, as necessary, an additive such as a reaction catalyst to obtain a solution (hydrophobizing agent solution) and to immerse the edge surface of the lens or the entire lens in the hydrophobizing agent solution or a method to apply the hydrophobizing agent solution to the edge surface of the lens by a known application method. One preferable example of application devices is a coating liquid applicator described in detail in Japanese Patent No. 5149809. When there is a possibility that immersion of a part or all of the lens in the hydrophobizing agent solution may result in deterioration of an optical surface of the lens due to the solvent of the hydrophobizing agent solution, it is preferable to seal the optical surface of the lens with a protective film or the like (e.g. aluminum foil) and then to perform immersion. When the hydrophobizing agent solution is an aqueous solution, usually, the treatment can be performed without sealing.

The hydroxyl group contributes to hydrophilicity of the polarizing polyvinyl alcohol film. Therefore, causing reaction between the hydroxyl group of polyvinyl alcohol and other functional groups results in partial hydrophobization of the polarizing polyvinyl alcohol film, thereby allowing for forming a hydrophobic region at a part of the polarizing polyvinyl alcohol film exposed at the edge surface of the lens or the outer periphery part including this part. A preferable specific aspect of the reaction between the hydroxyl group included in polyvinyl alcohol and other functional groups may be cross-linking reaction, dehydration reaction, halogenation, or the like. Hereinafter, each of the reactions will be further described; however, the present invention is not limited to specific aspects. Note that, the dehydration reaction also includes dehydration condensation reaction. Further, the cross-linking reaction includes an aspect where across-linking structure is formed by dehydration condensation reaction.

Polyvinyl alcohol is a polymer represented by —[$CH_2CH(OH)$]n— (where n is the number of recurring units). Cross-linking two hydroxyl groups (—OH) with a cross-linking agent allows for lowering hydrophilicity of polyvinyl alcohol and thereby forming a hydrophobic region. For example, when formaldehyde $HC(=O)H$ is used as the cross-linking agent, dehydration condensation reaction is carried out between formaldehyde and the two hydroxyl groups, thereby forming a cross-linking structure of —O—($CH_2$)—O— at a side chain of polyvinyl alcohol (acetalization). This as a known reaction as synthetic reaction of a so-called synthetic fiber vinylon. Acetalization may be performed with not limiting to formaldehyde but also with aldehyde such as acetaldehyde, glyoxal, and glutaraldehyde. Alternatively, a known cross-linking agent may be used such as melamine-formalin-based resin cross-linking agent, urea-formalin-based resin cross-linking agent, and epoxy-based cross-linking agent.

The dehydration reaction may be dehydration by alcohol (etherification), dehydration by silanol (silyl etherification), or dehydration by carboxylic acid (esterification). Further, halogenation may be performed by using a known halogenation agent such as hydrogen halide (e.g. HBr).

The above reactions are known and thus various reaction conditions such as a reaction temperature, reaction time, amount of hydrophobizing agent used, amount of a reaction reagent or additive used such as reaction catalyst, acid, and base that is arbitrarily used can be determined based on known techniques. For example, acetalization can be performed by immersing the polarizing lens in the hydrophobizing agent (cross-linking agent) solution with a temperature of 40 to 100° C. for approximately ten minutes to one hour with presence of an acid catalyst. As the acid catalyst, hydrochloric acid, sulfuric acid, or the like is usually used but not specifically limited thereto. Depending on the cross-linking agent, a reaction may proceed with presence of a basic catalyst. Further, dehydration is usually carried out under acidic conditions. After the hydrophobization treatment under acidic conditions is performed, neutralization may be arbitrarily carried out using a base. Conversely, after the hydrophobization treatment is performed under basic conditions, neutralization may be arbitrarily carried out using an acid.

The hydrophobic region formed by the above treatment 1 may be formed only at the part of the polarizing polyvinyl alcohol film interposed between two pieces of a lens base material and exposed at the edge surface of the lens or at an outer periphery part extending toward an inner part of the film with a predetermined width where the hydrophobizing agent solution permeates from the exposed part. Since the film is interposed between two pieces of a lens base material, permeation of the hydrophobizing agent solution can be stopped at the outer periphery part of the film. When the part exposed at the edge surface of the lens is hydrophobized, permeation of water or the like into the film can be prevented and thus a width from the edge part of the film of the hydrophobic region is not specifically limited.

Hydrophobization Treatment by Treatment 2

The treatment 2 is to apply water repellent agent to the edge surface of the lens including the part where the polarizing polyvinyl alcohol film is exposed. The water repellent agent may be diluted by a dilution solvent as necessary, which may be used as application liquid. The treatment 2 allows the polarizing polyvinyl alcohol film exposed at the edge surface of the lens to be protected by water repellent coating and thereby hydrophobized. Application of the water repellent agent may be performed on at least the part where the polarizing polyvinyl alcohol film is exposed at the edge surface of the lens; however, application on the entire surface of the edge surface of the lens including that part is also possible.

As the water repellent agent, a known water repellent agent may be used without limitation. Examples include a fluorine-containing polymer or a polymerizable compound that can form fluorine-containing polymer (monomer, oligomer, prepolymer, or the like, for example perfluoroalkyl acrylate). When a polymerizable compound is used as the water repellent agent, usually, a polymerization initiator corresponding to a type of the polymerizable compound is added to the water repellent agent application liquid and the water repellent agent is applied. Thereafter, curing treatment corresponding to the type of the polymerizable compound is performed (heating, irradiation with light, etc.). Moreover, an additive corresponding to a desired function may be arbitrarily added to the application liquid. For example, adding an ultraviolet light absorbent to the application liquid can prevent deterioration of the outer periphery part of the polarizing polyvinyl alcohol film due to water or the like and also provide, to the edge surface of the lens, coating having a function to prevent deterioration of the edge surface of the lens due to ultraviolet rays. The application liquid including an ultraviolet light absorbent can be prepared referring to descriptions in, for example, the description of Japanese Patent No. 5149809.

Furthermore, in order to enhance adhesion between the water repellent coating formed by the treatment 2 and the edge surface of the lens, a known primer (adhesive layer) may be provided to the edge surface of the lens before the hydrophobization treatment by the treatment 2. Moreover, a protective layer such as acrylic coating may be provided over the water repellent coating. Further, the protective layer may also be provided on the edge surface of the polarizing lens having been applied with the treatment 1.

As described above, frames of eyewear include a full-rim type and rimless type. Eyewear with the polarizing lens attached to a rimless frame is prone to deterioration due to permeation of water or the like since the edge surface of the polarizing lens is exposed at a rimless part. Contrary to this, in the lens applied with the aforementioned hydrophobization treatment, deterioration due to permeation of water or the like can be suppressed with presence of the hydrophobic region even in a state without protection by the rim.

Hereinafter, specific aspects of spectacles where the polarizing lens according to one aspect of the present invention is attached to a rimless frame will be described with reference to the drawings. However, the present invention is not limited to the following specific aspects.

Figure 2:
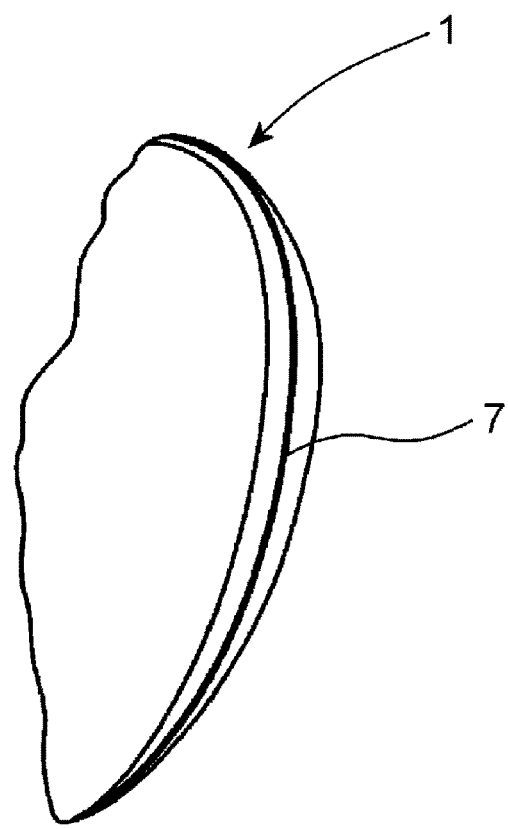
FIG. 2 is a perspective view explaining a state of an edge surface of the polarizing lens 1 in FIG. 1.
Figure 3:
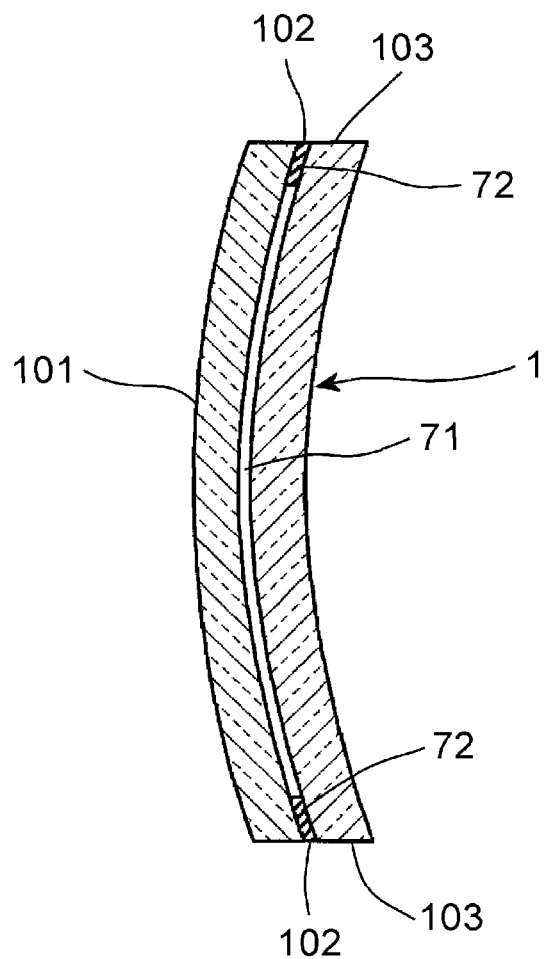
FIG. 3 is a cross-sectional view along a line A-A' in FIG. 1.

FIG. 1 is a front view of a left frame of rimless spectacles 2 of a two-point type including a polarizing lens 1 according to one aspect of the present invention. FIG. 2 is a perspective view explaining a state of an edge surface of the polarizing lens 1 illustrated in FIG. 1. FIG. 3 is a cross-sectional view along a line A-A' in FIG. 1.

In FIGS. 1, 2, and 3, a two-point frame mounted with the polarizing lens 1 according to one aspect of the present invention has a general structure. The frame has a structure where temples (not illustrated) and pads 3 support the spectacles at the face (nose part) and head (ear parts) such that an optical axis of the lens and vision of a pupil central position is not shifted.

Each of two lens locking parts 4a and 4b is a connecting part for holding the lens and connecting the lens with a bridge 5 and hinge 6. Holding the polarizing lens 1 is performed by boring the lens from the front and back of the optical surface thereof and fixing with the lens locking parts 4a and 4b via screws (not illustrated). One end other than the end holding the lens of each of the lens locking parts 4a and 4b is connected to the bridge 5 and hinge 6, respectively. The bridge 5 is a part to connect the lenses on the left and right. The hinge 6 is a part to connect the temple and also has a function to open and close the temple. Note that the structure of the frame is symmetrical.

As illustrated in FIG. 2, the polarizing lens 1 according to one aspect of the present invention has a structure where a polarizing film 7 is interposed within the lens. As an example, the lens is a plastic lens made of diethylene glycol bis-allyl carbonate formed by the cast polymerization method (casting method) with a lens power of 1.00 dioptres.

The polarizing film 7 used in this polarizing lens 1 is the polarizing polyvinyl alcohol film. In an outer periphery region (including an edge surface of the outer periphery) of the polarizing film 7, a hydrophobic region 72 where a hydroxyl group of polyvinyl alcohol has been reacted with other functional groups is formed unlike an inner region 71. This hydrophobic region 72 has a lower content ratio of hydroxyl group than that of the inner region 71 due to the above reaction and thus has a higher hydrophobicity than that of the inner region 71. As one preferable example, the hydrophobic region 72 is a region where polyvinyl alcohol is acetalized by aldehyde. Further, in one aspect, the polarizing film 7 is applied with the curved surface processing to approximate the film to a convex surface curve of a convex surface part 101 of the polarizing lens 1 before molding by the cast polymerization method. (Refer to FIG. 9 which will be described later.)

Furthermore, the polarizing lens 1 is applied with surface treatment, on the optical surface thereof, such as a hard coat and formation of an anti-reflection film and cut into a predetermined lens shape of a spectacle frame (edging processing) selected by a wearer. Further, an edge surface of an outer periphery 102 of the polarizing film 7 exposed at an edge surface part of the lens 103 is applied with the hydrophobization treatment while other parts of the edge surface part of the lens 103 is transparent and applied with mirror-finishing. The edge surface of an outer periphery 102 of the polarizing film 7 exposed at an edge surface part of the lens 103 is applied with the aforementioned hydrophobization treatment (edge surface treatment).

Figure 4:
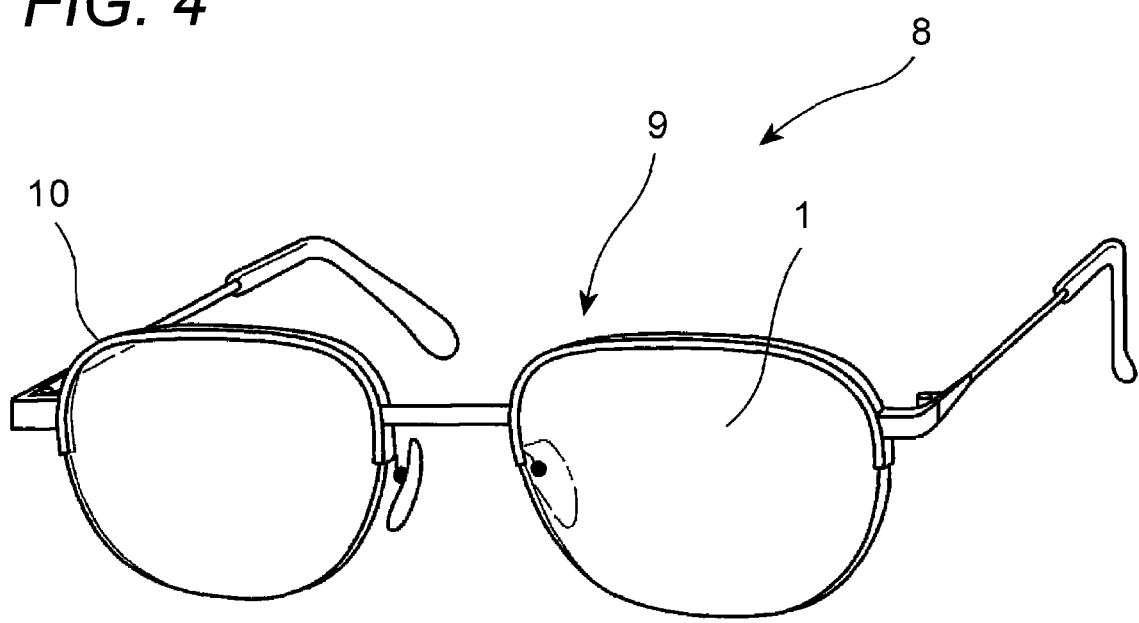
FIG. 4 is a perspective view of rimless polarizing spectacles of a rimlon type using the polarizing lens 1 according to one aspect of the present invention.
Figure 5:
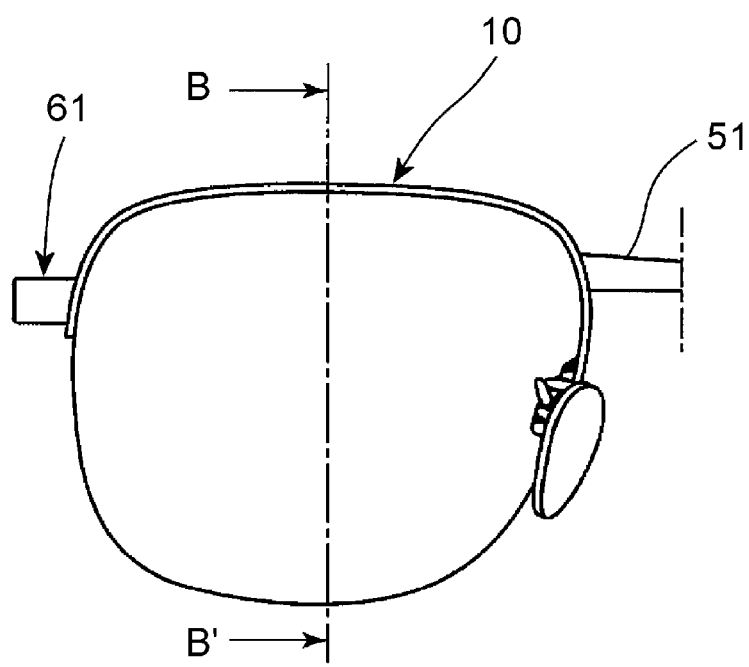
FIG. 5 is a front view of a left frame of the polarizing spectacles in FIG. 4.
Figure 6:
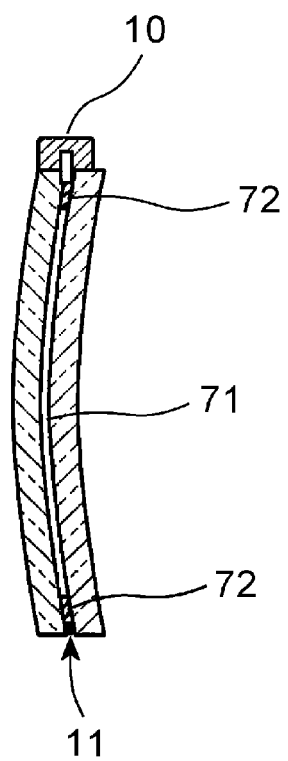
FIG. 6 is a cross-sectional view along a line B-B' in FIG. 5.

As other specific aspects, FIGS. 4, 5, and 6 are diagrams explaining rimlon spectacles 8 where the polarizing lens according one aspect of the present invention is mounted to a general rimlon frame.

A point where a rimlon frame 9 is different from the two-point frame is the support structure of the lens formed by a rim bar 10 and a lens supporting member 11.

The lens supporting member 11 (e.g. nylon fiber or metal fine wire) fitted to a fitting groove included in the whole circumference of the edge surface of the lens supports the lens 1 while the rim bar 10 positioned at an eyebrow part latches the supporting member 11 and the rim bar 10 hangs the polarizing lens 1. The rim bar 10 includes a rim formed in an upper part of the lens corresponding to the eyebrow part and a locking portion arranged to fix the lens supporting member (not illustrated). One end of the rim bar 10 is connected to a bridge 51 while the other end is connected to a hinge 61.

As illustrated in FIG. 6, the edge surface part of the polarizing lens having been subjected to the edge surface treatment as described in FIG. 1 is further applied with grooving processing as a postprocessing with the lens supporting member 11 fitted to a formed groove. The polarizing film 7 in the polarizing lens 1 is applied with the hydrophobization treatment similarly to the polarizing film included in the aforementioned rimless spectacles 2 of the two-point type and thus includes the hydrophobic region 72 having higher hydrophobicity than that of the inner region 71 in an outer periphery region. Other structures of the lens is similar to those of the aforementioned specific aspect. As one example, in the present aspect, the polarizing lens is a sunglasses type with a lens power of 0.00 dioptres with no prescription.

The aspect where the polarizing lens according to one aspect of the present invention is attached to the rimless frame has been described above; however, producing eyewear such as spectacles by attaching the polarizing lens according to one aspect of the present invention to a full-rim frame is of course possible.

Figure 7:
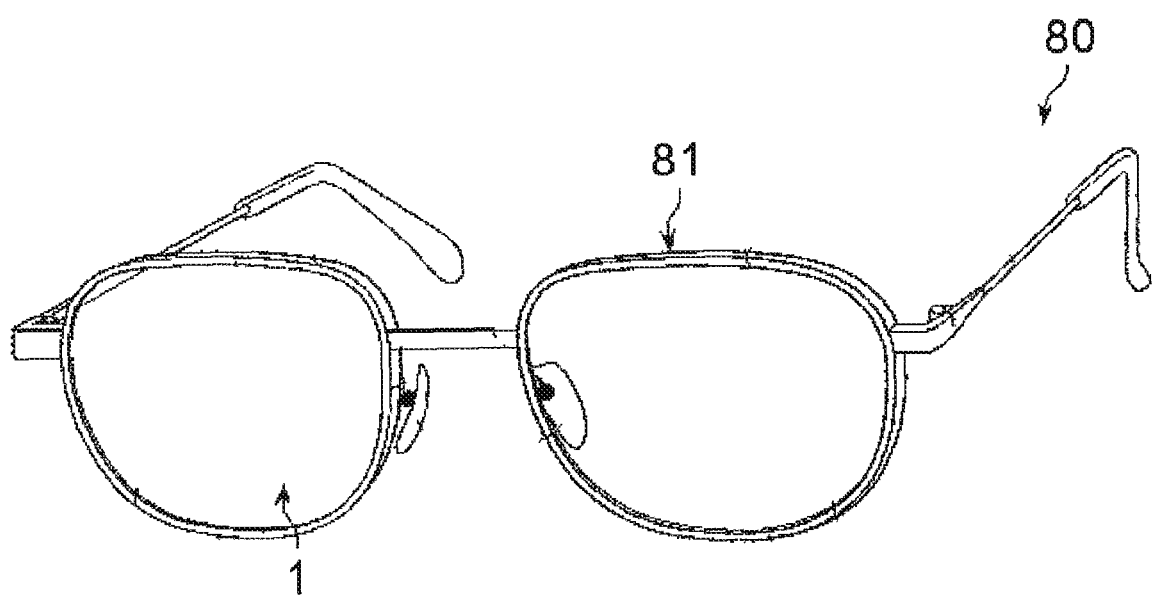
FIG. 7 is a perspective view of polarizing spectacles of a full-rim type using the polarizing lens 1 according to one aspect of the present invention.

FIG. 7 is a diagram explaining full-rim spectacles 80 where the polarizing lens according to one aspect of the present invention is mounted to a general full-rim frame. The full-rim spectacles 80 include the polarizing lens 1 fitted to a full-rim frame 81. In the full-rim spectacles 80, even when water or the like permeates from a slight gap between the edge surface of the polarizing lens 1 and the full-rim frame 81, the lens applied with the aforementioned hydrophobization treatment can be suppressed of deterioration by permeation of water or the like due to presence of the hydrophobic region.

Furthermore, eyewear including the polarizing lens according to one aspect of the present invention is also suitable for eyewear for water sports such as swimming goggles. Even when water permeates from a slight gap between the edge surface of the polarizing lens and a frame, deterioration can be suppressed as described above. Moreover, in eyewear including the polarizing lens according to one aspect of the present invention, a sealing member of a ring shape can be fitted to an outer periphery part of the polarizing lens as described in Patent Literature 3. Contrary to this, even when adhesion between the edge surface of the polarizing lens and sealing member is not enough, the lens applied with the aforementioned hydrophobization treatment can be suppressed of deterioration due to permeation of water or the like due to presence of the hydrophobic region.

(Curved Surface Processing of Polarizing Film)

Next, the curved surface processing of a polarizing film that can be performed in a suitable manner in the method for manufacturing a polarizing lens according to one aspect of the present invention will be described.

Two pieces of the lens base material interposing the polarizing film have a surface on an object side (convex surface) on one side and a surface on an eyeball side (concave surface) on the other side. The polarizing film having been subjected to the curved surface processing is arranged in a forming mold, thereby allowing for burying the polarizing film between two pieces of the lens base material along a curved surface shape of the lens. Preferably, the polarizing film is subjected to the curved surface processing by a press molding method while the polarizing film is made correspond to a molding surface shape (concave surface shape) of an upper mold.

For example, the polarizing film of a plane-shaped sheet is interposed by a pressing molding device including a temperature adjusting means (heater, cooling medium, etc.), pressing means, and a forming mold (matrix) where a male mold and female mold form a pair, thereby pressing and subjecting the polarizing film to the curved surface processing to process into a shape of a surface of the forming mold. As the male mold and female mold, those having a spherical molding surface are preferable for use. The spherical surface is not a complicated shape and thus does not require special pressing device but allows for use of an ordinary pressing molding device. Therefore, curving can be easily performed.

Figure 8:
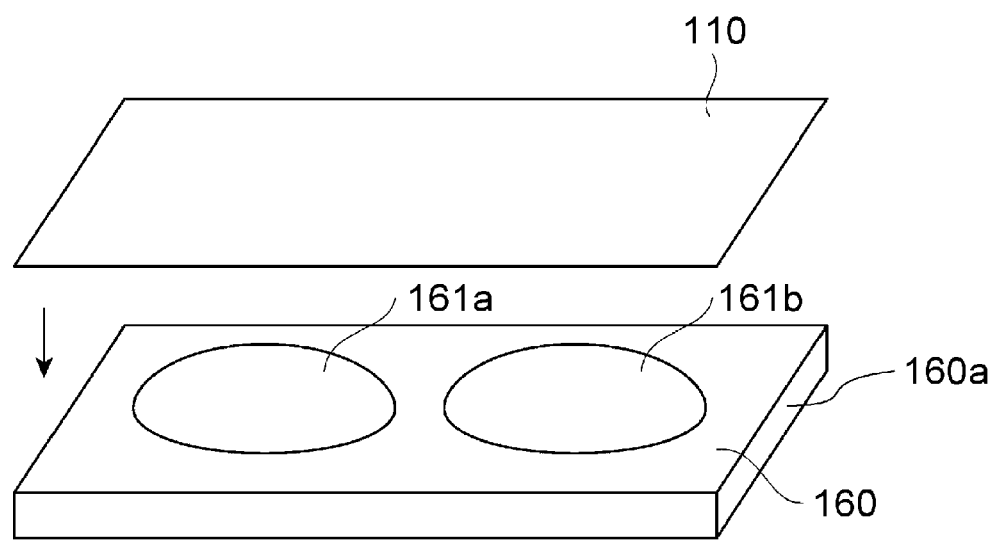
FIGS. 8(A) to 8(C) are diagrams explaining curved surface processing of a polarizing film.
Figure 8:
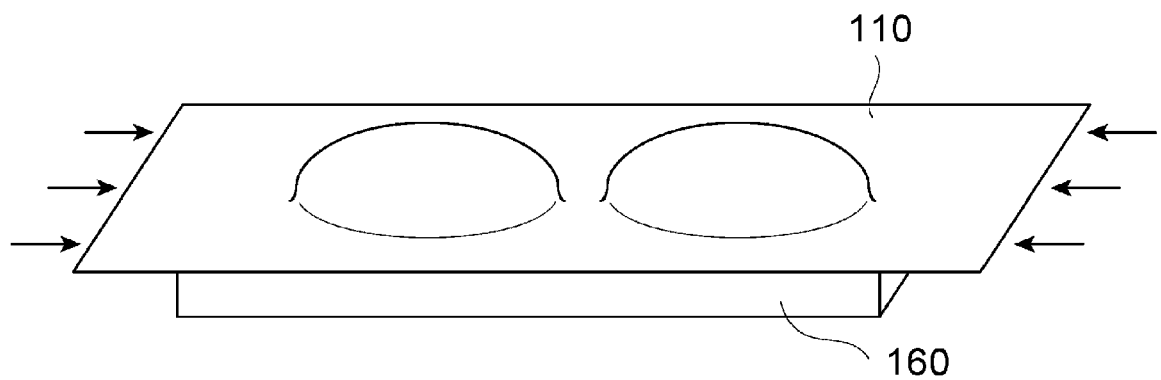
Figure 8:
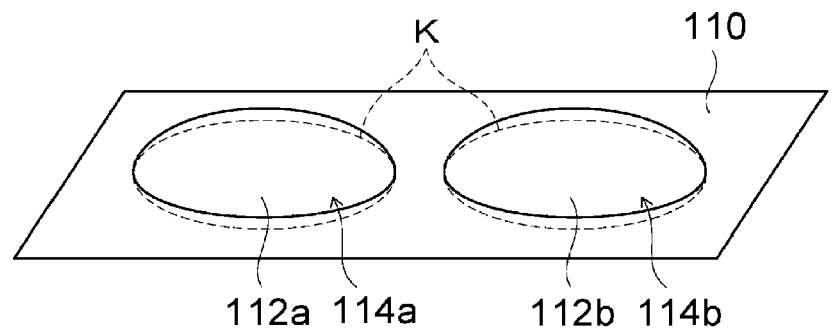

FIG. 8(A) is a diagram illustrating a curved surface processing plate of a male molding part. Sign 110 represents a film member of a plane shape and sign 160 represents the curved surface processing plate. The curved surface processing plate 160 is formed by a processing base part 160a made of ceramic with heat resistance and matrix parts 161 (161a and 161b) of spherical glass molds.

The curvature of a curved surface of the matrix part 161 is set according to a base curve of a refractive surface of the convex surface side of the lens to be produced.

The film member 110 of a flat plate shape which is the polarizing polyvinyl alcohol film cut into a rectangular shape is place on this matrix part of male mold. Pressing by a pressing means having the matrix part of female mold (not illustrated), for example at a room temperature (approximately 20 to 25° C.) results in transferring the shapes of curved surfaces 112a and 112b to the polarizing film, thereby obtaining the polarizing film having curved surfaces 114a and 114b.

It is preferable to wet the polarizing film before performing the curved surface processing, which enhances properties of transferring a shape from the matrix parts. Wetting treatment can be performed by a method such as leaving the polarizing film in a humidistatic high temperature device for a predetermined period of time or spraying the polarizing film with water in a mist state. Wetting can be performed in a heating atmosphere of approximately 50 to 90° C.

The wet polarizing film is preferably cooled since the curved surface processing is performed while most of water absorbed is retained in the film. For example, the polarizing film removed from the humidistatic high temperature device is left at a room temperature (approximately 20 to 25° C.) as it is, thereby cooling the polarizing film.

In one preferable aspect, the polarizing film having been subjected to the curved surface processing is then heated under a heating temperature of 105° C. to less than 150° C. Note that the heating temperature with regard to the polarizing film subjected to the curved surface processing refers to the temperature of the atmosphere where the heating treatment is performed. Heating the polarizing film having been subjected to the curved surface processing before arrangement in the forming mold prevents deformation of the polarizing film. As a result, deformation of a surface of the polarizing lens, especially deformation of a surface on the object side can be prevented. Here, a heating temperature of 105° C. or more can preferably prevent deformation while a heating temperature of less than 150° C. can prevent occurrence of color changes or distortion of the polarizing film. The heating temperature is preferably 120° C. or more, further preferably 130° C. or less. The heating treatment can be performed in the atmosphere.

Various methods can be employed as the heating method. In one aspect, the polarizing film is placed in a hot air circulating oven heated to the aforementioned temperature and thereby subjected to heat air for heating until the polarizing film shrinks enough.

When the film member 110 is subjected to the curved surface processing as illustrated in FIG. 8(B), a glass mold 160 and the film member 110 are preferably not separated but heated together. That is, the polarizing film having been subjected to the curved surface processing (film member 110) is retained by the curved surfaces 161 of the glass mold 160, thereby heated. Since the polarizing film extended along one axis has different levels of shrinkage depending on directions, a shape of the curved surface may change from a shape having been set. Contrary to this, retaining by the curved surfaces 161 of the glass mold 160 allows for shrinkage of the film member 110 according to a shape of the curved surface 161 of the glass mold 160. Therefore, molding can be performed with a more accurate curvature or shape of the curved surfaces 112 than in the case of heating without the glass mold 160.

Figure 9:
FIG. 9 is a cross-sectional view of a polarizing film having been subjected to the curved surface processing.

Next, as illustrated in FIG. 8(C), the film member 110 is cut along a broken line K in FIG. 8(C). In this manner, as a cross-section is illustrated in FIG. 9, the polarizing film 7 having been subjected to the curved surface processing to have a convex shape can be obtained.

By arranging the polarizing film applied with the curved surface processing described above in the forming mold and forming the lens by a casting method, the polarizing lens where the polarizing film having been subjected to the curved surface processing is interposed between two pieces of the lens base material can be obtained. This polarizing lens is usually subjected to the surface treatment and edging processing and thereafter applied with the aforementioned hydrophobization treatment. Fitting into a frame after the hydrophobization treatment results in spectacles or sunglasses including the polarizing lens as described above.

Also in another aspect, in order to further suppress deterioration of an outer periphery part of the polarizing film, a protective part can be provided to an edge surface of the lens after the hydrophobization treatment. Specific aspects of the polarizing lens provided with such a protective part are illustrated in FIGS. 10 and 11 (cross-sectional diagrams).

Figure 10:
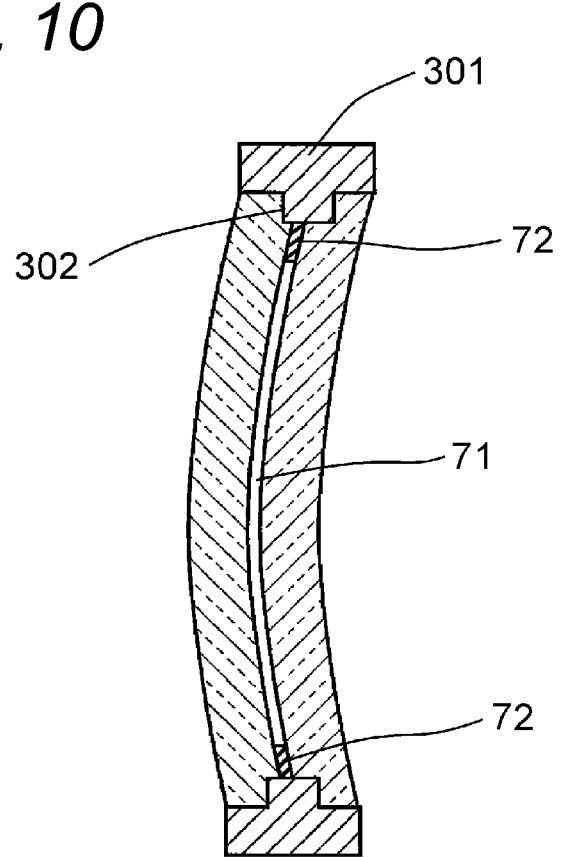
FIG. 10 is a cross-sectional view of a polarizing lens having a protective part.
Figure 11:
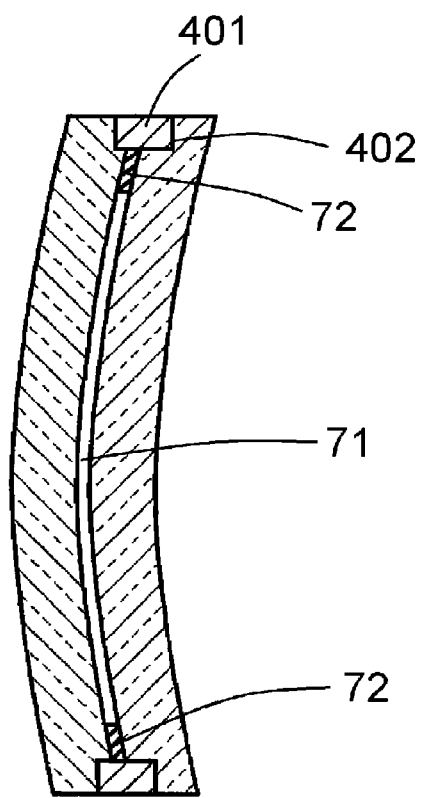
FIG. 11 is a cross-sectional view of a polarizing lens having a protective part.

The protective part illustrated in FIGS. 10 and 11 is fitted to a groove part formed in a part of the edge surface of the polarizing lens where the polarizing film is exposed.

A protective part 301 illustrated in FIG. 10 includes a covering part where a fitting part to be fitted to a groove part 302 is covered for the entire periphery of the edge surface of the polarizing lens. The covering part is provided to have substantially the same width as the width of the edge surface. Moreover, the protective part 301 is fitted to the groove part and thus is not shifted and capable of covering and protecting the polarizing film in a secured manner. As illustrated in FIG. 10, the protective part 301 is not provided to a surface on the object side or a surface on the eyeball side of the polarizing lens and thus appearance of the spectacles is not impaired.

A protective part 401 illustrated in FIG. 11 includes a fitting part, to be fitted to a groove part 402, which does not protrude from an edge surface of the polarizing lens. Providing the fitting part in such a manner does not change a shape of an outer periphery of the lens. Therefore, appearance of spectacles does not change because of the protective part.

As a material of the protective part, materials that can be used as the lens base material such as acrylic resin, thiourethane-based resin, thioepoxy-based resin, methacrylate-based resin, allyl-based resin, episulfide-based resin, or polycarbonate resin or silicone resin may be used. When the protective part is formed by the same material as that of the lens base material, the lens base material and protective part can be integrated, thereby allowing the protective part to be inconspicuous.

EXAMPLES

Hereinafter, the present invention will be further described based on examples. However, the present invention is not limited to aspects illustrated in the examples.

Example 1

Figure 12:
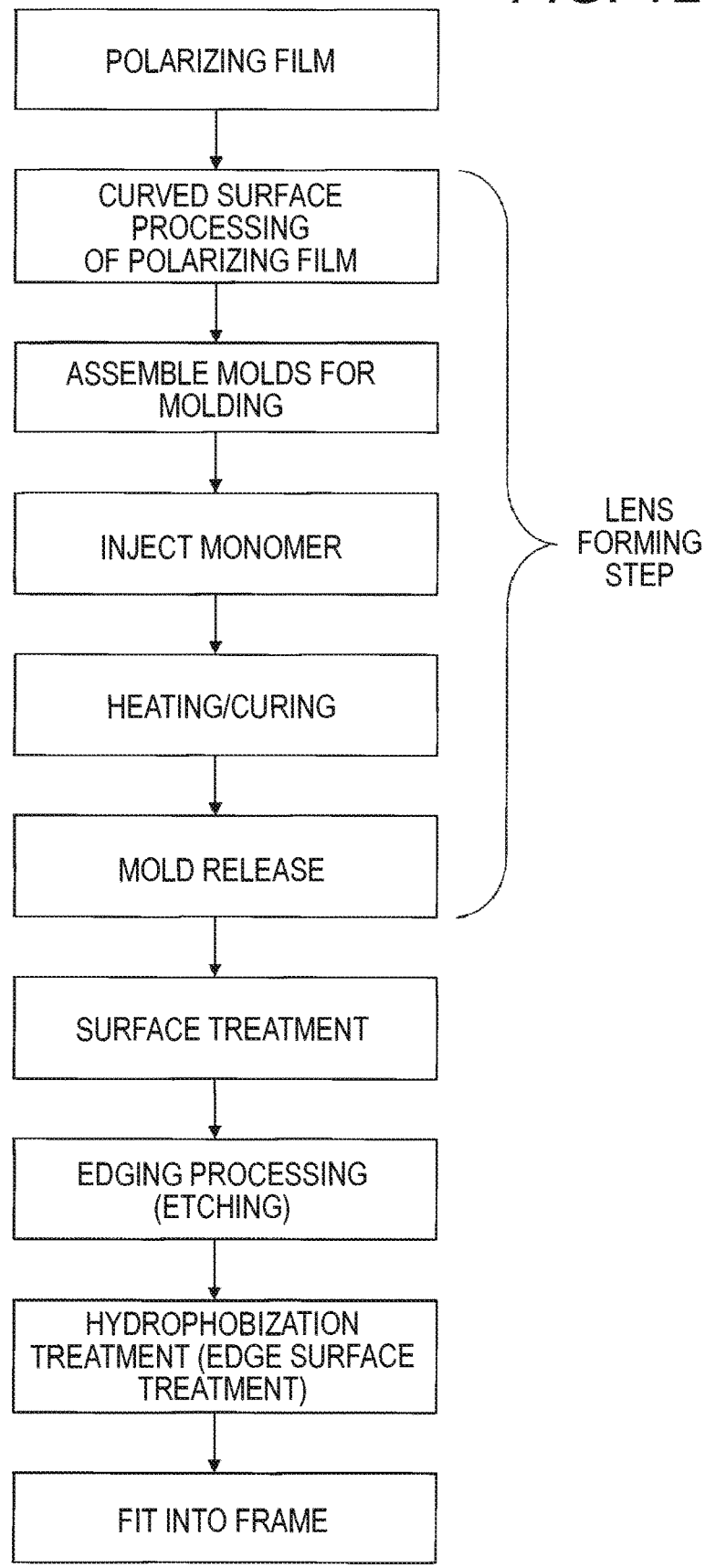
FIG. 12 is a diagram explaining a manufacturing flow of a polarizing lens of an example.

FIG. 12 is a diagram explaining a manufacturing flow of a polarizing lens of an example. The polarizing film is applied with the curved surface processing before arrangement in the forming mold. Details thereof are as described earlier. The curvature of the curved surface of the matrix part 161 was set according to a base curve (6 base) of the refractive surface of the convex surface side of the lens to be produced.

Figure 13:
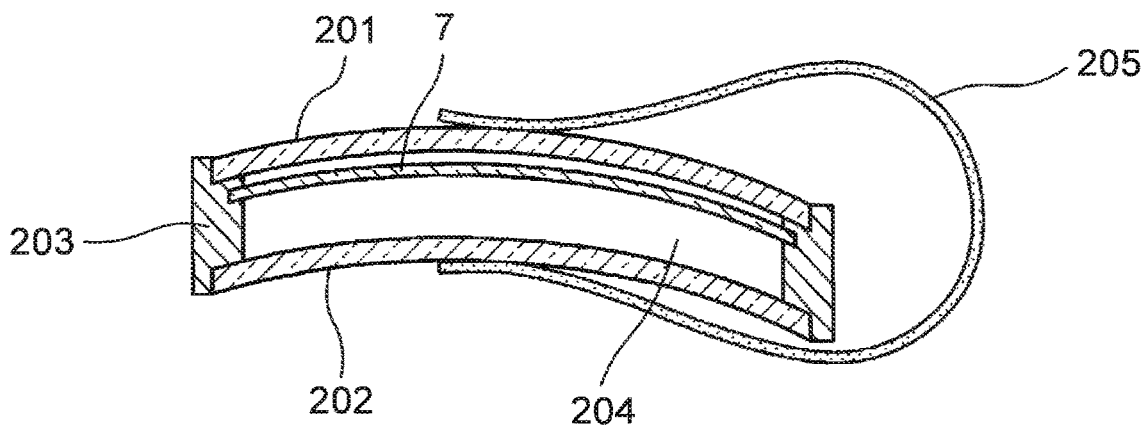
FIG. 13 is a cross-sectional view of mold forming molds used in an example.

As a molding method of the lens, a casting method was used. The casting method is a molding method to, as illustrated in FIG. 13, perform polymerization curing of a lens monomer within a cavity 204 formed by an upper mold 201, lower mold 202, and a sealing member 203 to adjust a distance between the upper and lower molds and to determine a lens thickness and to obtain a lens after mold release. Sign 205 represents a clamping member, made of an elastic body such as a spring, to clamp and fix the upper and lower molds. Incidentally, a state where the cavity 204 is formed by the upper mold 201, lower mold 202, sealing member 203, and clamping member 205 is referred to as mold forming molds.

(Assembly of Mold Forming Molds)

The forming mold (mold forming molds) used in the casting method was assembled in the following manner.

First, the polarizing film 7 having been subjected to the curved surface processing was allowed to be retained by a polarizing film mounting part of the gasket 203, thereby prepared the gasket 203 attached with the polarizing film.

Next, in the gasket, the upper mold 201 was arranged opposite to a convex surface side of the polarizing film while the lower mold 202 was arranged opposite to a concave surface side of the polarizing film 7 such that a distance between the upper mold 201 and lower mold 202 forms a predetermined cavity. When the cavity was formed, material properties such as polymerization shrinkage of a lens monomer (lens raw material liquid) were considered. As a result, an interval between the upper and lower molds was set such that a predetermined lens thickness based on a lens design is satisfied.

(Injection of Monomer, Heating/Curing, and Mold Release)

A lens monomer was stirred and subjected to vacuum defoaming and then injected to the assembled forming mold. Thereafter, the forming mold was placed in a heating furnace (atmosphere polymerization furnace) and subjected to temperature elevation in the heating furnace from 30° C. to 120° C. in 21 hours, thereby heated and cured the lens monomer.

Figure 14:
FIG. 14 is a cross-sectional view of a lens produced in an example after mold release.

After the heating and curing, the forming mold was removed from the heating furnace. The gasket 203 was then separated and the lens was removed from the upper mold 201 and lower mold 202, thereby obtained the polarizing lens illustrated in FIG. 14. The removed lens by mold release included the polarizing film 7 interposed between two pieces of the lens base material. The obtained lens was the polarizing lens where the polarizing film was interposed between lens base materials made of polyurethane with a refractive index of 1.67 and Abbe number of 32. The lens power was 1.00 dioptres.

(Surface Treatment)

As a surface treatment, a hard coat and anti-reflection film were formed by the following method.

The polarizing lens 7 was subjected to hard coat treatment by an immersion method using coating liquid containing colloidal silica with an organosilicon compound as a matrix component. The speed of pulling up was 26 cm/min. After application, air-drying was performed at 80° C. for 20 minutes and then baking was performed at 130° C. for 120 minutes. The thickness of a cured coating film obtained in this manner was approximately 2 μm.

Next, on the polarizing lens 7 applied with the hard coat treatment, an anti-reflection multilayer film including five layers of $SiO_2$, $ZrO_2$, $SiO_2$, $ZrO_2$, and $SiO_2$ in an order from the lens base material toward the atmosphere was formed by a vacuum vapor deposition method.

The first layer of $SiO_2$ layer, a subsequent equivalent film layer of $ZrO_2$ and $SiO_2$, still subsequent $ZrO_2$ layer, and the upper most $SiO_2$ layer were formed such that an optical film thickness of each of the above equals $\lambda/4$. Incidentally, a design wavelength $\lambda$ was 520 nm.

(Edging Processing)

Next, edging processing was performed on the lens of a round shape applied with the aforementioned surface treatment using a lens shape processing device (GE-5000, manufactured by HOYA CORPORATION) such that the lens corresponds to a lens shape of a specified spectacle frame (FIG. 1), thereby obtained a cut lens.

(Hydrophobization Treatment (Edge Surface Treatment))

The whole polarizing lens having been subjected to the edging processing was immersed in 60 ml of an aqueous solution of formaldehyde (at a concentration of 7 mass %), to which 12 ml of hydrochloric acid of 32 mass % was added and then left at 70° C. for 20 minutes. Here, the aqueous solution may arbitrarily stirred. Adding hydrochloric acid initiates acetalization. Acetalization of polyvinyl alcohol proceeds from a part exposed at the edge surface of the lens.

Thereafter, the polarizing lens pulled out from the aqueous solution of formaldehyde was neutralized by an aqueous solution of sodium hydroxide and then rinsed with pure water. In this manner, obtained was the polarizing lens having a region in the edge surface of the lens where an edge surface of the hydrophobized (acetalized) polarizing polyvinyl alcohol film is exposed and having other regions applied with transparent polishing processing.

Comparative Example 1

The polarizing lens was obtained by similar steps to those of the example 1 except for the point that the hydrophobization treatment was not performed.

Example 2

The polarizing lens was obtained by similar steps to those of the example 1 except for the point that a monomer capable of forming a commercial lens base material made of polyurethane with a refractive index of 1.60 and Abbe number of 42 was used as a lens monomer.

Comparative Example 2

The polarizing lens was obtained by similar steps to those of the example 2 except for the point that the hydrophobization treatment was not performed.
(Water Resistance Test)

The polarizing lenses produced in the examples and comparative examples were immersed in a thermostatic water tank with water set at 90° C. and the lenses were pulled up at a certain time interval for observation of changes. When water resistance is not enough, the polarizing film is decolored and colors change. When permeation of water further proceeds, the polarizing film dissolves into the thermostatic water tank. In cases where permeation of water was observed, a size (width of deterioration) of a part with changes from the edge of the lens to the center thereof was measured in the unit of millimeter. A result therefrom is illustrated in table 1.

TABLE 1

| | REFRACTIVE INDEX OF RESIN | ACETAL TREATMENT | WATER RESISTANCE TEST, WATER AT TEMPERATURE OF 90° C. WIDTH OF DETERIORATION (UNIT: mm) | |
|---|---|---|---|---|
| | | | 5 HOURS | 24 HOURS |
| EXAMPLE 1 | 1.67 | PERFORMED | 0.0 | 1.7 |
| EXAMPLE 2 | 1.60 | PERFORMED | 0.0 | 2.1 |
| COMPARATIVE EXAMPLE 1 | 1.67 | NOT PERFORMED | 1.2 | 6.2 |
| COMPARATIVE EXAMPLE 2 | 1.60 | NOT PERFORMED | 0.9 | 7.4 |

From a result in Table 1, in the examples 1 and 2, suppression of deterioration due to permeation of water can be confirmed since the part of the polarizing polyvinyl alcohol film exposed at the edge surface of the lens were acetalized and thus hydrophobized.

Figure 15:
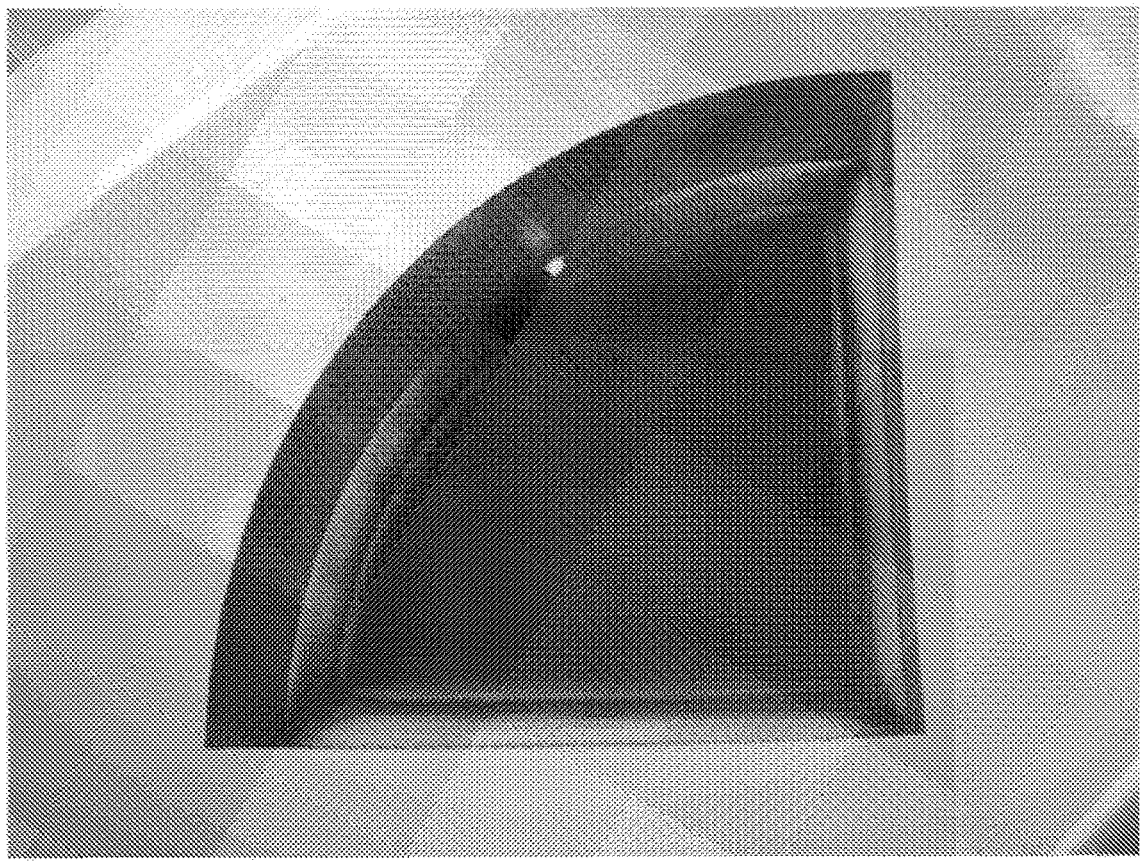
FIG. 15 is a picture, imaged by a digital camera, of a part cut out from a polarizing lens produced in an example 1 after a water resistance test (24 hours).

Further, FIG. 15 is a picture, imaged by a digital camera, of a part cut out from the polarizing lens produced in the example 1 after the water resistance test (24 hours).

Figure 16:
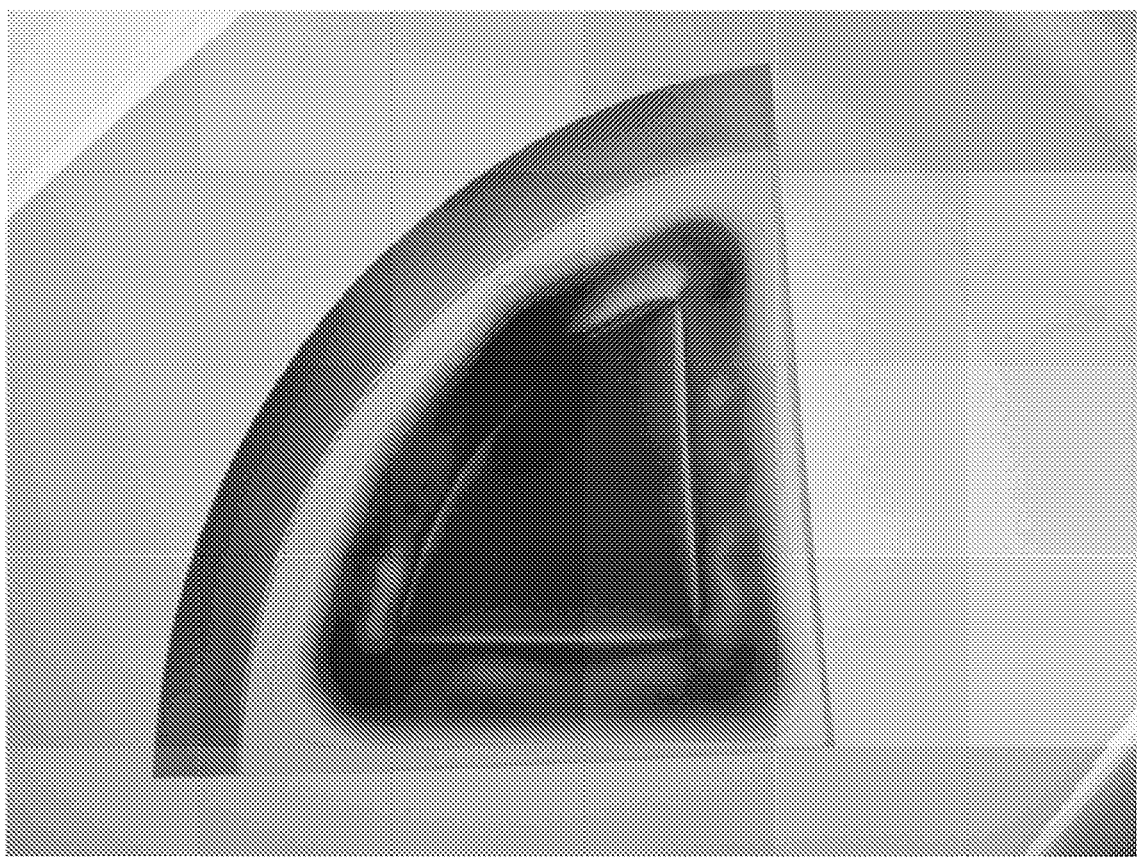
FIG. 16 is a picture, imaged by a digital camera, of a part cut out from a polarizing lens produced in a comparative example 1 after the water resistance test (24 hours).

FIG. 16 is a picture, imaged by a digital camera, of a part cut out from the polarizing lens produced in the comparative example 1 after the water resistance test (24 hours).

As illustrated in FIG. 15, the polarizing lens produced in the example 1 was uniform even after the water resistance test of 24 hours. Contrary to this, as illustrated in FIG. 16, the polarizing lens produced in the comparative example 1 showed discoloration and color changes of the polarizing film at an outer periphery part of the lens after the water resistance test of 24 hours.

In this manner, according to the present invention, the polarizing lens where the polarizing polyvinyl alcohol film is exposed at the edge surface of the lens can prevent permeation of water from the exposed part, thereby preventing deterioration of the film.
(Frame Fitting)

The polarizing lenses produced in the examples 1 and 2 were attached to two-point frames and rimless spectacles were obtained.

Note that when the lens is a semifinished lens, a concave surface is subjected to grinding/polishing processing by a curve generator and polishing device after mold release to allow the concave surface to meet prescriptions to obtain an eyesight corrective spectacle lens.

Examination on Heating Temperature of Polarizing Film after Curved Surface Processing
<Production of Sample Lens 1>

1. Wetting Treatment, Curved Surface Processing, and Subsequent Heating Treatment of Polarizing Film A commercial dichroic dye-based polarizing film made of PVA was arranged in a humidistatic high temperature device and subjected to the wetting treatment and thereby allowed to be wet such that a water content at the start of curved surface processing equals 4%. The wet polarizing film was left at a room temperature (20 to 25° C.) for approximately two minutes and then subjected to the curved surface processing in the aforementioned method explained based on FIG. 8. The curved surface processing was also performed at the room temperature.

Next, the polarizing film having been subjected to the curved surface processing was heated at 120° C. for 30 minutes using a commercial hot air circulating oven. Heating was performed without using the curved surface processing plate (glass mold) 160.

2. Molding of Lens by Cast Polymerization Method and Mold Release

Plastic lens raw materials of 50.6 g of m-xylene diisocyanate and 49.4 g of 4,8-dimercaptomethyl-1,11-dimercapto-3,6,9-tri-thia undecane were mixed and stirred sufficiently.

An ultraviolet light absorbent of 1.2 g of "SEESORB701" (trade name, manufactured by SHIPRO KASEI KAISHA, LTD.) and an internal mold release agent of 0.1 g of "internal mold release agent for MR series" (trade name, manufactured by Mitsui Chemicals, Inc.) were further added, mixed, and sufficiently stirred. In the plastic lens raw materials completely dispersed or dissolved, a catalyst of 100 ppm of dibutyltin dichloride was added and sufficiently stirred at a room temperature to obtain uniform liquid and a composition therefrom was stirred under reduced pressure of 5 mmHg and subjected to deaeration for 30 minutes, thereby produced a lens monomer.

Into the forming mold, where the polarizing film having been subjected to the heating treatment of the above #1 is arranged therein, the produced lens monomer was injected. A surface shape of the upper mold and lower mold was spherical with an inner diameter of 80 mm and a radius of curvature of 130.4 mm.

Thereafter, the forming mold was placed in a heating furnace, retained at 30° C. for seven hours, and then subjected to temperature elevation from 30 to 120° C. in 10 hours, thereby performed heating and curing.

After the heating and curing, the forming mold was removed from the heating furnace. The lens was removed from the forming mold, thereby obtained the lens (semifinished lens). Subjecting a concave surface of the lens to grinding/polishing processing by a curve generator and polishing device allows for obtaining an eyesight corrective spectacle lens that meets prescriptions.

<Evaluation of Optical Performance of Lens>

In order to evaluate deformation of lens after mold release (in a round uncut state), optical performance was evaluated according to the following items. Note that examination by visual inspection was performed by an inspector having three or more years of experience in lens examination. An evaluation result was as illustrated in Table 2.

(1) Deformation of Shape

The maximum radius of curvature (mm) (Rmax) and minimum radius of curvature (mm) (Rmin) at the geometrical center point on the convex surface of the lens (namely, optical center) were measured by a curvature radius measuring apparatus "FOCOVISON" (manufactured by Automation & Robotics).

A curvature difference between the maximum radius of curvature (mm) and minimum radius of curvature (mm) (Rmax−Rmin) was used as an index of lens deformation (astigmatism) and evaluation was performed in the following manner. Note that the convex surface of the lens is designed to be spherical and the geometrical center on the convex surface is a point of intersection of a perpendicular, passing through the center of a circle when the lens is seen from a planar view, and the lens convex surface side of the lens.

A curvature difference of 0 to less than 3 mm: ○ (passed), 3 mm to less than 4 mm: Δ (slight deformation acknowledged but no problem for use), and 4 mm or more: x (difficult to use).

(2) Color Change of Polarizing Film

Whether there is a color change in the polarizing film 7 in the lens was confirmed by visual inspection.

No color change: ○
Color change without change in hue acknowledged: Δ
Color change with apparent change in hue acknowledged: x (3) Distortion of Polarizing Film Distortion of the polarizing film (deformation of a surface shape) in the lens was examined by visual inspection (an inspector having three or more years of experience in lens examination).

No distortion acknowledged at all: ○
Distortion acknowledged at a part of periphery of the lens but no problem for use: Δ
Distortion acknowledged at a glance: x Total Evaluation The lens that showed no result of x in any items of the deformation of lens, color change of polarizing film, and distortion of polarizing film was evaluated as ○ while the lens showed at least one result of x was evaluated as x. The lens showed a result of ○ at every evaluation item was evaluated as ⊙.

<Sample Lenses 2 to 5 and Reference Lenses 1 to 4>

Each of the sample lenses and reference lenses was produced in a similar manner to that of production of the sample lens 1 except for a point that heating of the polarizing film having been subjected to the curved surface processing was performed under conditions shown in Table 2. Note that the reference lens 1 was used without heating the polarizing film.

<Sample Lenses 6 and 7 and Reference Lenses 5 and 6>

In production of the sample lens 1, instead of a commercial dichroic dye-based polarizing film made of PVA, a commercial laminated polarizing film (TAC/PVA) including protective layers made of TAC on both surfaces of a dichroic dye-based polarizing film made of PVA was used. Each of the sample lenses and reference lenses was produced in a similar manner to that of production of the sample lens 1 except for a point that heating of the polarizing film was performed under conditions shown in Table 2.

<Sample Lens 8>

The lens was produced in a similar manner to that of production of the sample lens 2 except for a point that heating was performed while the polarizing film was retained by the curved surface processing plate 160 used in the curved surface processing.

TABLE 2

| | POLARIZING FILM | GLASS MOLD | HEATING CONDITION OF POLARIZING FILM | | Rmax (nm) | Rmin (nm) | Rmax − Rmin (nm) | DEFORMATION OF LENS | COLOR CHANGE OF POLARIZING FILM | DISTORTION OF POLARIZING FILM | TOTAL EVALUATION |
|---|---|---|---|---|---|---|---|---|---|---|---|
| | | | HEATING TEMPERATURE (° C.) | HEATING TIME (HOUR) | | | | | | | |
| SAMPLE LENS 1 | PVA | NOT USED | 120 | 0.5 | 129 | 127.9 | 1.1 | ○ | ○ | Δ | ○ |
| SAMPLE LENS 2 | PVA | NOT USED | 120 | 2 | 129 | 126.3 | 2.7 | ○ | ○ | Δ | ○ |
| SAMPLE LENS 3 | PVA | NOT USED | 130 | 2 | 129.7 | 126.9 | 2.8 | ○ | ○ | Δ | ○ |
| SAMPLE LENS 4 | PVA | NOT USED | 105 | 2 | 130.1 | 126.6 | 3.5 | Δ | ○ | Δ | ○ |
| SAMPLE LENS 5 | TAC/PVA | NOT USED | 140 | 2 | 128.9 | 128.1 | 0.8 | ○ | Δ | Δ | ○ |
| SAMPLE LENS 6 | TAC/PVA | NOT USED | 120 | 2 | 129 | 127.8 | 1.2 | ○ | ○ | Δ | ○ |
| SAMPLE LENS 7 | PVA | NOT USED | 140 | 2 | 129.2 | 128 | 1.2 | ○ | Δ | Δ | ○ |
| SAMPLE LENS 8 | PVA | USED | 120 | 2 | 129 | 127.7 | 1.3 | ○ | ○ | ○ | ⊙ |
| REFERENCE LENS 1 | PVA | NOT USED | — | — | 135.7 | 127.9 | 7.8 | X | ○ | Δ | X |
| REFERENCE LENS 2 | PVA | NOT USED | 60 | 5 | 136.1 | 128.1 | 8 | X | ○ | Δ | X |

TABLE 2-continued

| | POLARIZING FILM | GLASS MOLD | HEATING CONDITION OF POLARIZING FILM | | | | | | COLOR CHANGE OF POLARIZING FILM | DISTORTION OF POLARIZING FILM | TOTAL EVALUATION |
|---|---|---|---|---|---|---|---|---|---|---|---|
| | | | HEATING TEMPERATURE (° C.) | HEATING TIME (HOUR) | Rmax (nm) | Rmin (nm) | Rmax − Rmin (nm) | DEFORMATION OF LENS | | | |
| REFERENCE LENS 3 | PVA | NOT USED | 100 | 5 | 132.4 | 127.8 | 4.6 | X | ○ | Δ | X |
| REFERENCE LENS 4 | PVA | NOT USED | 150 | 2 | 129.5 | 128 | 1.5 | ○ | X | Δ | X |
| REFERENCE LENS 5 | TAC/PVA | NOT USED | 100 | 2 | 136.5 | 126.5 | 10 | X | ○ | Δ | X |
| REFERENCE LENS 6 | TAC/PVA | NOT USED | 150 | 2 | 129.5 | 128 | 1.5 | ○ | X | Δ | X |

As illustrated in Table 2, the sample lens 4 where the polarizing film having been subjected to the curved surface processing was heated at 105° C. had a curvature radius difference (Rmax−Rmin) of 3.5 mm. Further, the sample lenses 5 to 7 where the polarizing film was heated at 140° C. showed a color change without change in hue; however, any of the sample lenses showed no practical problem for use as the polarizing lens.

Moreover, it became clear that heating at 120° C. to 130° C. can provide a lens with superior optical performance and appearance where deformation of the lens or color change of the polarizing film is reduced.

The sample lenses 6 and 7 using the laminated polarizing film also showed similar results, which made clear that using a polarizing film heated under similar conditions can suppress deformation of lens shape even with other films without limiting to the PVA film.

Contrary to this, the reference lenses 1 to 3 and 5 had a curvature radius difference (Rmax−Rmin) of 4 mm or more and showed serious deformation of lens shape. Any of the reference lenses 1 to 3 and 5 was subjected to a heating temperature of less than 105° C. This shows that shrinkage of the polarizing film before injection of a polymerizable composition as a lens base material may not be sufficient. This may have caused shrinkage of the polarizing film upon heating and curing and thereby caused deformation in the lens.

Furthermore in the reference lenses 4 and 6, the polarizing film was heated at 150° C. and thus deformation of the lens was suppressed but the polarizing film was deteriorated and a color change occurred.

In the sample lenses 1 to 7 where the curved surface processing plate 160 was not used, a shape of the polarizing film was slightly distorted. On the other hand, in the sample lens 8 where the curved surface processing plate 160 was used, the lens having a superior optical performance with suppressed distortion was obtained.

Therefore, it became clear that heating while the polarizing film is retained by the curved surface processing plate 160 can suitably suppress deformation of the shape and distortion of the polarizing film and allows for obtaining the lens with better appearance.

From the above results, heating the lens having been subjected to the curved surface processing at a predetermined temperature is confirmed to allow for providing the polarizing lens with less deformation of the surface shape thereof that causes astigmatism.

Further, heating the polarizing film having been subjected to the curved surface processing while the polarizing film is retained by the curved surface processing plate 160 used for the curved surface processing can suppress change, from a design shape, of a shape of the curved surface 161a (c.f. FIG. 8(A)) of the polarizing film. Therefore, the polarizing lens with more preferable appearance can be manufactured.

Combining the curved surface processing as described above and the hydrophobization treatment described in detail earlier allows for obtaining the polarizing lens of an extremely high quality where deterioration of an outer periphery part of the polarizing film and deformation of s surface shape of the lens are both suppressed.

INDUSTRIAL APPLICABILITY

The present invention is useful in the field of manufacturing various eyewear such as spectacles and a polarizing lens for eyewear.

The invention claimed is:

1. A polarizing lens comprising:
two pieces of a lens base material;
a polarizing polyvinyl alcohol film arranged between the two pieces of the lens base material,
wherein:
the polarizing polyvinyl alcohol film includes a hydrophobic acetalized region at least at a partial region of an outer periphery part including an edge surface thereof,
the hydrophobic acetalized region is present only on the outer periphery part of the polarizing polyvinyl alcohol film,
the hydrophobic acetalized region is exposed at least at a part of an edge surface of the lens,
the hydrophobic acetalized region has a higher hydrophobicity and a lower content ratio of hydroxyl group than other regions of the polarizing polyvinyl alcohol film, and
the hydrophobic acetalized region is formed from an acetalization reaction involving at least one aldehyde selected from the group consisting of formaldehyde, acetaldehyde, and glyoxal.

2. Eyewear comprising a frame and a lens attached to the frame, wherein the lens is the polarizing lens according to claim 1.

3. The eyewear according to claim 2, wherein the eyewear is spectacles.

4. The polarizing lens according to claim 1, wherein the at least one aldehyde is acetaldehyde.

* * * * *